US009872443B2

(12) United States Patent
Burch

(10) Patent No.: US 9,872,443 B2
(45) Date of Patent: Jan. 23, 2018

(54) APPARATUS, SYSTEM AND METHOD FOR DELIVERING TREATMENT FLUID TO VEGETATION

(71) Applicant: Thomas B. Burch, Banner Elk, NC (US)

(72) Inventor: Thomas B. Burch, Banner Elk, NC (US)

( * ) Notice: Subject to any disclaimer, the term of this patent is extended or adjusted under 35 U.S.C. 154(b) by 0 days.

(21) Appl. No.: 15/273,854

(22) Filed: Sep. 23, 2016

(65) Prior Publication Data

US 2017/0086396 A1    Mar. 30, 2017

Related U.S. Application Data

(60) Provisional application No. 62/222,781, filed on Sep. 24, 2015.

(51) Int. Cl.
*A01G 23/095* (2006.01)
*A01C 15/02* (2006.01)
(Continued)

(52) U.S. Cl.
CPC ............ *A01G 23/095* (2013.01); *A01C 15/02* (2013.01); *A01G 1/001* (2013.01); *A01G 3/085* (2013.01);
(Continued)

(58) Field of Classification Search
CPC ...... A01G 23/095; A01G 1/001; A01G 3/085; A01G 3/00; A01G 3/04; A01G 3/047;
(Continued)

(56) References Cited

U.S. PATENT DOCUMENTS 2,625,188 A    1/1953   Moskoff
3,832,803 A *  9/1974   Blake .................. A01G 7/06
                                                 175/393
(Continued)

OTHER PUBLICATIONS

International Searching Authority/United States (ISA/US), International Search Report and Written Opinion of the ISA, Dec. 8, 2016 (Dec. 8, 2016), pp. 1-10, WIPO ISA/US, Alexandria, Virginia, United States.
(Continued)

*Primary Examiner* — Christopher P Ellis
*Assistant Examiner* — Jessica B Wong
(74) *Attorney, Agent, or Firm* — Christopher C. Dremann, P.C.; Christopher C. Dremann

(57) ABSTRACT

A fluid delivery assembly is operably coupled with a reciprocating saw having a saw blade to deliver a treatment fluid to a cut portion of vegetation as the vegetation is cut. A syringe contains the treatment fluid and a fluid delivery tube has a reservoir end in fluid communication with the syringe and a delivery end adjacent the cut portion of the vegetation. A carrier is contains a portion of the fluid delivery assembly and a harness attached to the carrier has at least one strap for an operator to carry the carrier during operation of the reciprocating saw. A stepper motor is operably coupled to a PCB for storing operating parameters and for executing the operating parameters to induce advancing movement of a plunger relative to the syringe. The operating parameters are provided to the PCB by an external computing device and the PCB and stepper motor receive electrical power through an electrical power and logic cable from a power supply of the reciprocating saw. The fluid delivery tube is provided with a check valve at the reservoir end and the delivery end to retain the treatment fluid within the fluid delivery tube.

14 Claims, 8 Drawing Sheets

(51) Int. Cl.
*A01G 1/00* (2006.01)
*A01G 3/08* (2006.01)
*A01M 21/04* (2006.01)
*A01G 7/06* (2006.01)
*A01G 3/00* (2006.01)

(52) U.S. Cl.
CPC .............. *A01G 7/06* (2013.01); *A01M 21/043* (2013.01); *A01G 2003/007* (2013.01)

(58) Field of Classification Search
CPC ................ A01G 3/0535; A01G 3/062; A01G 2003/007; A01C 15/02; A01M 21/043
See application file for complete search history.

(56) References Cited

U.S. PATENT DOCUMENTS

| | | | |
|---|---|---|---|
| 4,891,882 A | 1/1990 | Bloom et al. | |
| 5,718,050 A * | 2/1998 | Keller | A01G 3/08 16/DIG. 12 |
| 6,125,621 A | 10/2000 | Burch | |
| 6,990,770 B2 | 1/2006 | Terrell | |
| 8,181,351 B1 | 5/2012 | Brim, III | |
| 8,621,752 B1 | 1/2014 | Brim, III | |
| 2007/0017684 A1* | 1/2007 | Stirm | B25D 11/062 173/109 |
| 2008/0104780 A1 | 5/2008 | Dayton et al. | |
| 2008/0168663 A1 | 7/2008 | Yang et al. | |
| 2008/0250570 A1* | 10/2008 | Dayton | B25F 3/00 7/170 |
| 2008/0257416 A1* | 10/2008 | Hickman | F16L 29/04 137/223 |
| 2009/0119935 A1 | 5/2009 | Gatten et al. | |
| 2016/0279652 A1* | 9/2016 | States, III | B05B 7/2418 |

OTHER PUBLICATIONS

Folimonova, S.Y. and Achor, D.S., Early Events of Citrus Greening (Huanglongbing) Disease Development at the Ultrasonic Level, Bacteriology, vol. 100, No. 9, 2010, pp. 949-958.

* cited by examiner

APPARATUS, SYSTEM AND METHOD FOR DELIVERING TREATMENT FLUID TO VEGETATION

CROSS REFERENCE TO RELATED APPLICATION

This United States non-provisional utility patent application claims the benefit of priority to U.S. Provisional Application No. 62/222,781 filed on Sep. 24, 2015, the entire contents of which are incorporated herein by reference.

FIELD OF THE INVENTION

The present invention relates generally to apparatus, systems and methods for applying treatment fluid to vegetation. More particularly, the invention is an apparatus, system and method for delivering a treatment fluid into the vascular tissue of vegetation as the vegetation is cut, trimmed, pruned or the like.

BACKGROUND OF THE INVENTION

It is generally known to apply a treatment fluid, such as a herbicide, insecticide, bactericide, fertilizer or the like, to vegetation for the purpose of retarding the growth, enhancing the growth and/or promoting the health of the vegetation, as desired. In most cases, the treatment fluid is applied by spraying a liquid solution including the diluted treatment fluid onto the vegetation. Even though the solution containing the treatment fluid is diluted, spraying inherently results in significant waste of the treatment fluid since application of the solution cannot be confined onto the vegetation. Furthermore, diluting the solution containing the treatment fluid may result in an ineffective amount of the treatment fluid being applied to the vegetation.

It is also generally known to apply a treatment fluid directly onto vegetation as the vegetation is cut, trimmed, pruned or the like. U.S. Pat. No. 6,990,770 issued Jan. 31, 2006, to Terrell discloses an apparatus for trimming and chemically treating trees. The apparatus is mounted on a boom extending from a truck and includes a saw blade assembly with limb clamping jaws and a sprayer assembly having a nozzle for administering a chemical treatment fluid onto the vegetation adjacent the saw blade as the tree limb is cut. U.S. Pat. No. 4,891,882 issued Jan. 9, 1990, to Bloom et al., as well as U.S. Pat. No. 8,181,351 B1 issued May 22, 2012, and U.S. Pat. No. 8,621,752 B1 issued Jan. 7, 2014, to Brim, III, each disclose an apparatus for applying a treatment fluid to one or more of the blades of a cutting implement, such as pruning shears, clippers, or the like, utilized to cut plants.

Citrus greening disease, also known as Huanglongbing (HLB) or yellow dragon disease, is one of the most serious citrus plant diseases ever known to mankind. Once a citrus tree is infected with the disease, there is no cure. Citrus greening disease is believed to be caused by the bacterium Candidatus Liberibacter asiaticus. The disease has adversely affected citrus production around the world, and first reached the southern Florida region of the United States in August, 2005. Since that time, citrus greening disease has spread into the southeastern United States and millions of citrus trees have been lost to the disease. Citrus greening disease is currently managed by a topical application of insecticides intended to control the Asian citrus psyllid population believed to be primarily responsible for transmitting the disease. Control of the psyllid population alone, however, has not stopped the spread of citrus greening disease. Although there is no cure yet known for citrus trees infected with citrus greening disease, research suggests that healthy trees may be inoculated against the disease by application of a treatment fluid, for example via antibiotic pulse treatments (APTs) of penicillin-G, streptomycin, oxytetracycline (OTC) and the like.

The most efficient and cost effective process for introducing a treatment fluid to vegetation is through the plant's vascular system. In vascular plants, the xylem and phloem tissues act as the conducting elements for translocating water, nutrients, sugars, proteins and ribonucleic acid (RNA) throughout the plant. In particular, the phloem is the tissue in vascular plants that conducts organic nutrients from the leaves and other photosynthetic tissues to all parts of the plant, including the roots. The phloem are best accessed at the moment the vegetation is cut, trimmed, pruned or the like. Accordingly, a treatment fluid delivered to the vascular tissues of a vascular plant as the vegetation is cut, trimmed or pruned is most likely to be conducted by the phloem to the roots of the plant. Unfortunately, the existing apparatus for applying a treatment fluid to vegetation as it is cut, trimmed or pruned are not well suited for use with citrus trees on the large scale necessary to combat citrus greening disease. In particular, the existing apparatus utilize the blades of conventional pruning shears or clippers (e.g., Bloom, Brim, III) and apply a treatment fluid from a relatively small reservoir containing the treatment fluid onto one or more of the blades as the vegetation is cut. Alternatively, existing apparatus utilize a relatively large saw blade mounted on a boom extending from a truck and spray the treatment fluid adjacent the saw blade as the tree limb is cut (e.g., Terrell).

Accordingly, what is needed is an improved apparatus, system and method for applying a treatment fluid to vegetation as the vegetation is cut, trimmed, pruned or the like. An apparatus, system and method for applying a treatment fluid to vegetation as the vegetation is cut, trimmed, pruned or the like is also needed that is both efficient and cost effective. More particularly, an apparatus, system and method for delivering a treatment fluid to citrus trees exposed to citrus greening disease is needed that is compact and that delivers only a therapeutically effective amount of the treatment fluid directly into vascular tissues of the citrus tree at the time a limb of the citrus tree is cut, trimmed, pruned or the like.

Certain aspects, objects, features and advantages of the present invention will be made apparent, or will be readily understood and appreciated by those skilled in the relevant art, as exemplary embodiments of the invention shown in the accompanying drawing figures are described in greater detail hereinafter. It is intended that all such aspects, objects, features and advantages of the invention envisioned by this disclosure of exemplary embodiments be encompassed by the scope of protection of the appended claims, given their broadest reasonable construction and interpretation in view of the prior art. These aspects, objects, features and advantages of the invention, as well as others not expressly disclosed, may be accomplished by the exemplary embodiments described herein and illustrated in the accompanying drawings. Nevertheless, it should be understood and appreciated that the written description and drawing figures are for illustrative purposes only, and that many modifications, changes, revisions and substitutions may be made to any of the exemplary embodiments without departing from the broad, general concepts of the invention.

SUMMARY OF THE INVENTION

In one aspect, the present invention is embodied by an apparatus for delivering a treatment fluid to vegetation. The apparatus includes a fluid delivery assembly adapted to be operably coupled with a reciprocating saw having a saw blade to deliver the treatment fluid to a cut portion of the vegetation as the vegetation is cut. The fluid delivery assembly includes a reservoir for containing the treatment fluid and a fluid delivery tube having a reservoir end in fluid communication with the reservoir and a delivery end disposed adjacent the cut portion of the vegetation. The treatment fluid is delivered to the cut portion of the vegetation as the saw blade of the reciprocating saw cuts the vegetation. In one embodiment, the reservoir includes a syringe and a plunger configured for advancing movement relative to the syringe to dispense the treatment fluid through an opening in a tip of the syringe opposite the plunger in response to the advancing movement of the plunger. In another embodiment, the fluid delivery assembly further includes a stepper motor configured for inducing the advancing movement of the plunger relative to the syringe. In another embodiment, the stepper motor is operably coupled to a printed circuit board having a memory for storing one or more operating parameters of the stepper motor and a processor for executing the one or more operating parameters of the stepper motor to thereby induce the advancing movement of the plunger relative to the syringe. In yet another embodiment, the operating parameters of the stepper motor are provided to the memory of the printed circuit board by an external computing device in communication with the processor of the printed circuit board. In yet another embodiment, the stepper motor receives electrical power through an electrical power and logic cable that is in electrical communication with a power supply of the reciprocating saw. In yet another embodiment, the fluid delivery assembly further includes an adapter for connecting the reservoir end of the fluid delivery tube to the reservoir, and the adapter has a check valve for preventing back-flow of the treatment fluid from the fluid delivery tube into the reservoir. In yet another embodiment, the fluid delivery assembly further includes a threaded metering valve barb and a threaded metering valve nosepiece configured for attachment to the metering valve barb, and one of the metering valve barb and the metering valve nosepiece houses a check valve for preventing flow of the treatment fluid out of the fluid delivery tube onto the cut portion of the vegetation without a flow pressure present in the fluid delivery tube.

In another aspect, the present invention is embodied by a system for delivering a treatment fluid to vegetation. The system includes a reciprocating saw having a saw blade with the saw blade adapted for reciprocating movement to cut vegetation. The system further includes a fluid delivery assembly having a reservoir for containing the treatment fluid and a fluid delivery tube in fluid communication with the reservoir at a reservoir end and disposed adjacent a cut portion of the vegetation at a delivery end. The fluid delivery assembly is operably coupled with the reciprocating saw to deliver the treatment fluid to the cut portion of the vegetation as the vegetation is cut by the saw blade of the reciprocating saw. In one embodiment, the system further includes a carrier defining an interior compartment of an enclosure configured for containing a portion of the fluid delivery assembly and a harness attached to the carrier and having at least one strap for an operator to carry the carrier containing the portion of the fluid delivery assembly during operation of the reciprocating saw. In another embodiment, the reservoir includes a syringe and a plunger configured for advancing movement relative to the syringe to dispense the treatment fluid through an opening in a tip of the syringe opposite the plunger in response to the advancing movement of the plunger. In another embodiment, the fluid delivery assembly further includes a stepper motor configured for inducing the advancing movement of the plunger relative to the syringe. In yet another embodiment, the stepper motor is operably coupled to a printed circuit board having a memory for storing on or more operating parameters of the stepper motor and a processor for executing the one or more operating parameters of the stepper motor to thereby induce the advancing movement of the plunger relative to the syringe. In yet another embodiment, the operating parameters of the stepper motor are provided to the memory of the printed circuit board by an external computing device in communication with the processor of the printed circuit board, and the stepper motor receives electrical power through an electrical power and logic cable that is in electrical communication with a power supply of the reciprocating saw. In yet another embodiment, the fluid delivery assembly further includes an adapter for connecting the reservoir end of the fluid delivery tube to the reservoir and the adapter includes a check valve for preventing back-flow of the treatment fluid from the fluid delivery tube into the reservoir. In yet another embodiment, the fluid delivery assembly further includes a metering valve barb and corresponding metering valve nosepiece configured for attachment to the metering valve barb at the delivery end of the fluid delivery tube, and one of the metering valve barb and the metering valve nosepiece houses a check valve for preventing flow of the treatment fluid out of the fluid delivery tube onto the cut portion of the vegetation without a flow pressure present in the fluid delivery tube.

In yet another aspect, the present invention is embodied by a method for delivering a treatment fluid to vegetation. The method includes providing a reciprocating saw having a saw blade configured for reciprocal movement to cut vegetation. The method further includes providing a fluid delivery assembly comprising a reservoir for containing the treatment fluid and a fluid delivery tube in fluid communication with the reservoir, the fluid delivery assembly being operably coupled with the reciprocating saw to deliver the treatment fluid to a cut portion of the vegetation as the saw blade of the reciprocating saw cuts the vegetation. In one embodiment, the method further includes providing an external computing device adapted for transmitting operating parameters to a printed circuit board of the fluid delivery assembly that is operably coupled with a stepper motor configured for inducing linear motion of a plunger relative to a syringe containing the treatment fluid and in fluid communication with the fluid delivery tube. In another embodiment, a portion of the fluid delivery assembly is disposed within an interior compartment defined by an enclosure of a carrier configured to be supported on an operator while operating the reciprocating saw and delivering the treatment fluid to the cut portion of the vegetation as the vegetation is cut by the saw blade.

BRIEF DESCRIPTION OF THE DRAWINGS

The aforementioned aspects, objects, features and advantages of the present invention will be more fully understood and appreciated when considered in conjunction with the accompanying drawing figures, in which like reference characters designate the same or similar parts throughout the several views.

DETAILED DESCRIPTION OF EXEMPLARY EMBODIMENTS OF THE INVENTION

Exemplary embodiments of an apparatus, system and method for delivering a treatment fluid to vegetation are described in greater detail hereinafter and are shown, depicted and/or illustrated by the accompanying drawing figures. An apparatus, system and method according to the present invention is useful for delivering a treatment fluid to vegetation as the vegetation is cut, trimmed, pruned or the like. By way of particular example and not limitation, the present invention provides an apparatus, system and method for delivering a treatment fluid to a citrus tree to combat the spread of citrus greening disease, also known as Huanglongbing (HLB) or yellow dragon disease. The treatment fluid, for example an antibiotic such as oxytetracycline (OTC) in hydrochloride salt form, may be used to kill the motile bacteria Candidatus Liberibacter present in infected citrus trees, as well as to inoculate relatively healthy citrus tree against the disease.

For purposes of cost effectiveness and efficiency, the apparatus, system and method of the present invention deliver the treatment fluid directly into a cut portion of a citrus tree as the citrus tree is being cut, trimmed, pruned or the like, such that the treatment fluid is immediately and entirely absorbed into the vascular tissues (i.e., phloem) of the citrus tree. It should be noted that the uses, capabilities and applications of the present invention are not intended to be limited to delivering a treatment fluid to a cut portion of a citrus tree. Instead, the invented apparatus, system and method are intended to be useful and applicable for delivering any type of a treatment fluid, including by way of example and not limitation a herbicide, insecticide, bactericide, fertilizer or the like, to any type of vascular plant, including by way of further example and not limitation other fruit trees and vineyard plants having a disease caused by a microbial pathological infection, such as canker, etc. Likewise, the invention may be useful for topping tobacco plants to remove suckers and to chemically manage the growth of suckers following topping.

Figure 1:
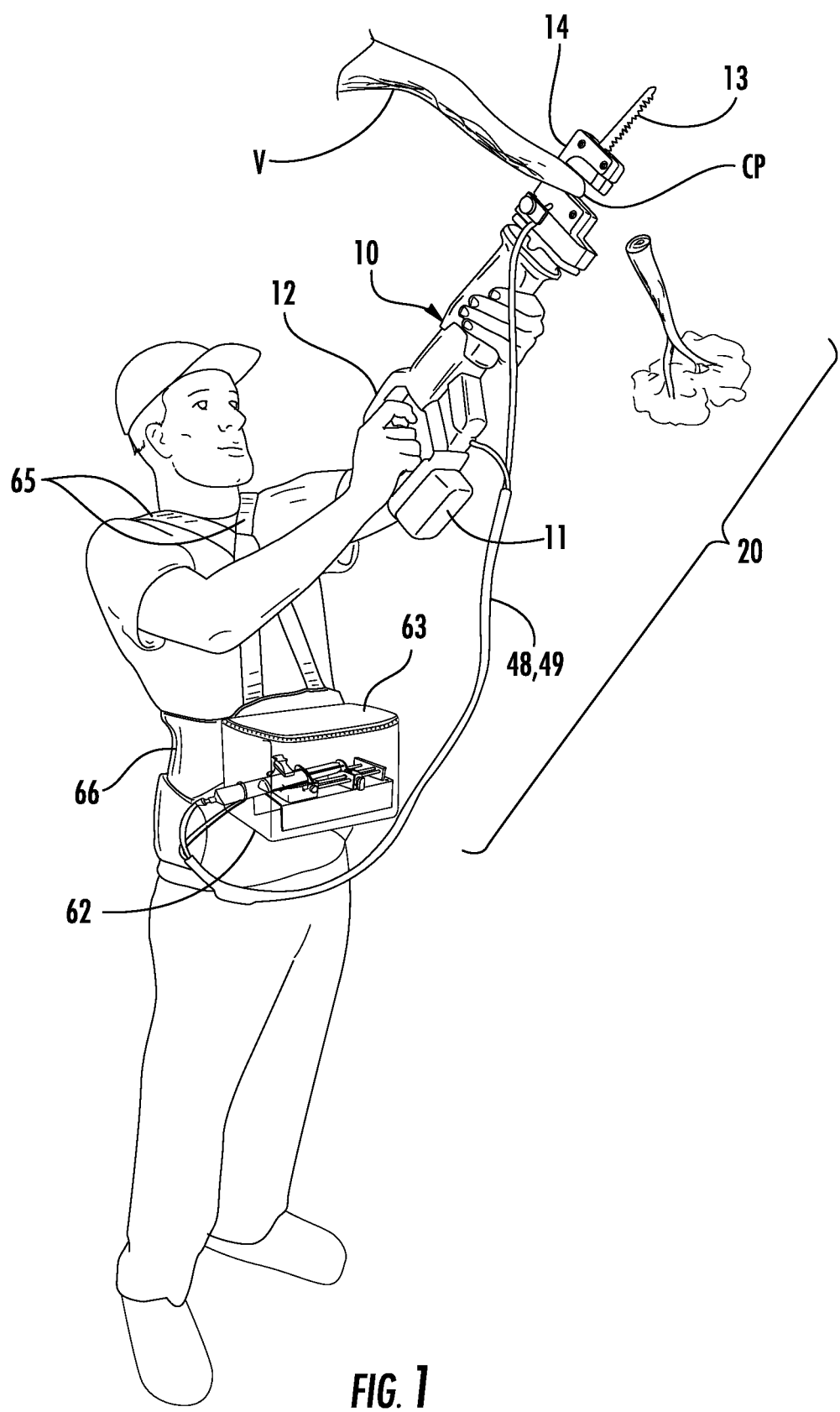
FIG. 1 is an environmental perspective view of an apparatus, system and method for delivering a treatment fluid to vegetation as the vegetation is cut according to an exemplary embodiment of the present invention.

FIG. 1 shows an exemplary embodiment of an apparatus, indicated generally by reference character 20, for delivering a treatment fluid to vegetation V according to the present invention. The apparatus 20 is configured for being operably coupled with a reciprocating saw 10 suitable for cutting, trimming or pruning vegetation V wherein the reciprocating saw 10 has been modified for use with the system 30 of the invention comprising the apparatus 20 and the reciprocating saw 10. By way of example and not limitation, reciprocating saw 10 may be a Bare-Tool DCS380B 20 Volt MAX Li-Ion reciprocating saw available from DeWALT Industrial Tool Company of Baltimore, Md., USA, or alternatively, an M28™ SAWZALL® reciprocating saw available from Milwaukee Electric Tool Corporation of Brookfield, Wis., USA. Regardless, the reciprocating saw 10 is modified as necessary to operate with the apparatus 20 to deliver a treatment fluid to a cut portion CP of the vegetation V as the vegetation V is cut, trimmed, pruned or the like.

The reciprocating saw 10 may be powered by an external source of electrical power, but typically is powered by a portable battery or battery pack in a known manner. Preferably, the reciprocating saw 10 is powered by a portable, relatively lightweight, rechargeable, lithium ion battery 11 that is removably mounted to the reciprocating saw adjacent a handle or hand grip 12 provided at a first end of the reciprocating saw. A saw blade 13 is movably mounted on the reciprocating saw 10 within a blade housing 14 provided at a second end of the reciprocating saw 10 opposite the hand grip 12. In the embodiments shown and described herein, the saw blade 13 is mounted for reciprocal movement within the blade housing 14 at the second end of the reciprocating saw 10 in a conventional manner. A trigger 12A is provided on the hand grip 12 for activating the reciprocal movement of the saw blade 13. The handle 12 and the blade housing 14 of the reciprocating saw 10, however, are modified to receive a fluid delivery assembly 40 of the apparatus 20 for delivering a treatment fluid to the cut portion CP of the vegetation V, as will be described hereinafter.

Figure 2:
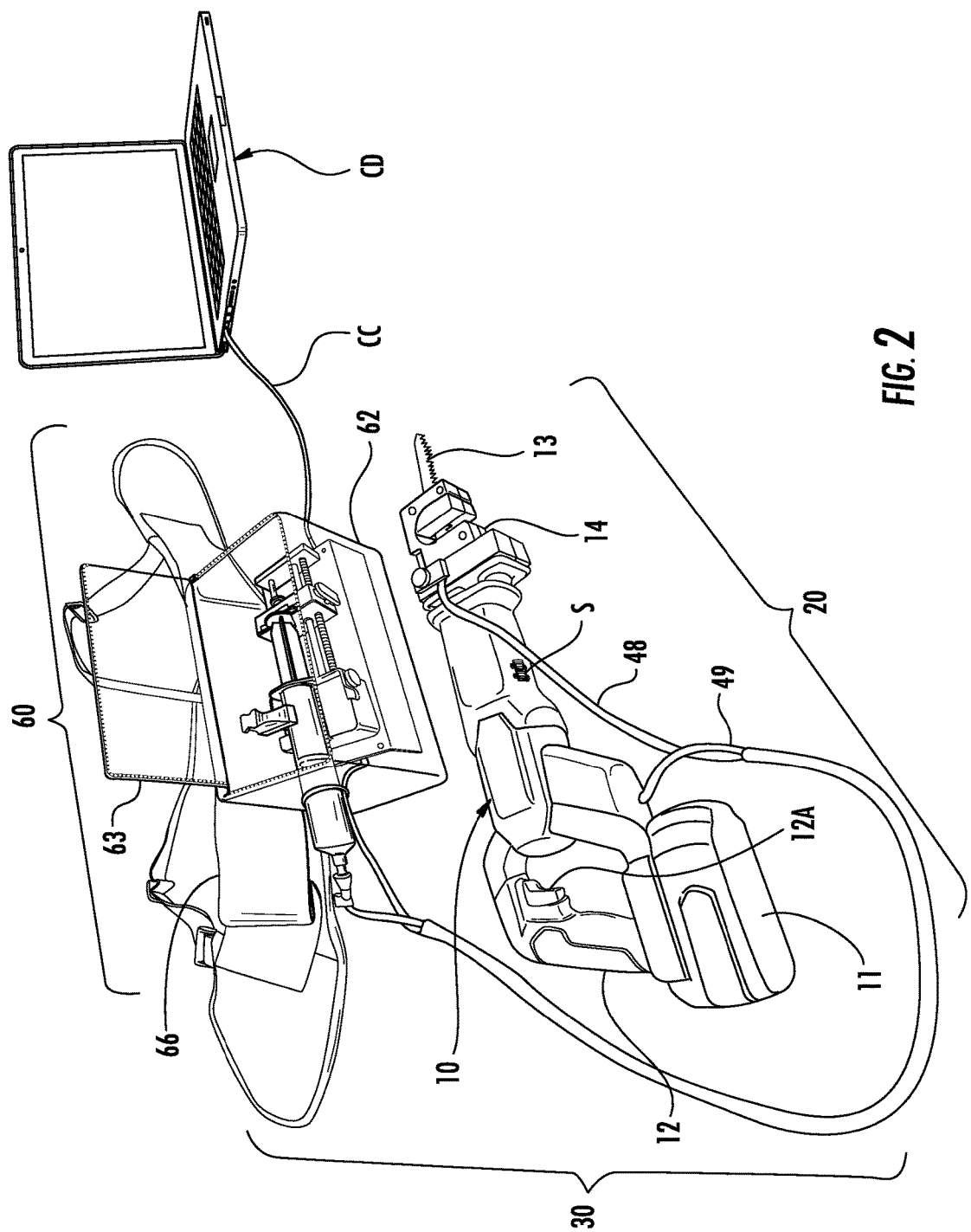
FIG. 2 is a perspective view of an exemplary embodiment of the system shown in FIG. 1 for delivering a treatment fluid to vegetation.

FIG. 2 shows an exemplary embodiment of a system 30 comprising the reciprocating saw 10 operably coupled with the apparatus 20 for delivering a treatment fluid to vegetation V. If desired, the system 30 may be adapted to communicate with an external computing device CD, such as a mobile personal computing device (e.g., laptop computer, Smartphone, etc.) or a remote computer system, for the purpose of exchanging (i.e., receiving and transmitting) data between the system 30 and the computing device CD. By way of example and not limitation, the apparatus 20 of the system 30 may comprise a printed circuit board PCB (see FIG. 5) having a processor and memory P/M adapted for receiving and storing operating parameters, such as delivery rate, associated with a particular application of the treatment fluid. Alternatively, or in addition, the processor and memory P/M of the PCB may be adapted for transmitting historical data relating to a particular application of the treatment fluid. The PCB of the apparatus 20 and the computing device CD may be in data communication with one another in any suitable manner including direct communication (hard-wired), near field communication (NFC), wireless communication (cellular, Bluetooth, etc.) or via a global computer network, such as the Internet. By way of example, the PCB of the apparatus 20 may be temporarily hard-wired to a mobile personal computing device (laptop, tablet, Smartphone, etc.) via a data communication cable CC.

Regardless, as previously mentioned, the system 30 comprises reciprocating saw 10 and apparatus 20. The apparatus 20 further comprises a fluid delivery assembly 40 and a carrier assembly 60 for holding various components of the fluid delivery assembly 30 while operating and/or transporting the system 30. In general, system 30 comprises the modified reciprocating saw 10, the apparatus 20, including fluid delivery assembly 40 and carrier assembly 60, and the optional computing device CD. The various components of the system 30 will be described in greater detail hereinafter. However, it should be understood and appreciated that the components of the system 30 may be combined and arranged in any manner using any embodiment or combination of embodiments, that accomplishes the invented method of delivering a treatment fluid to vegetation V as the vegetation is cut, trimmed, pruned or the like.

Figure 3:
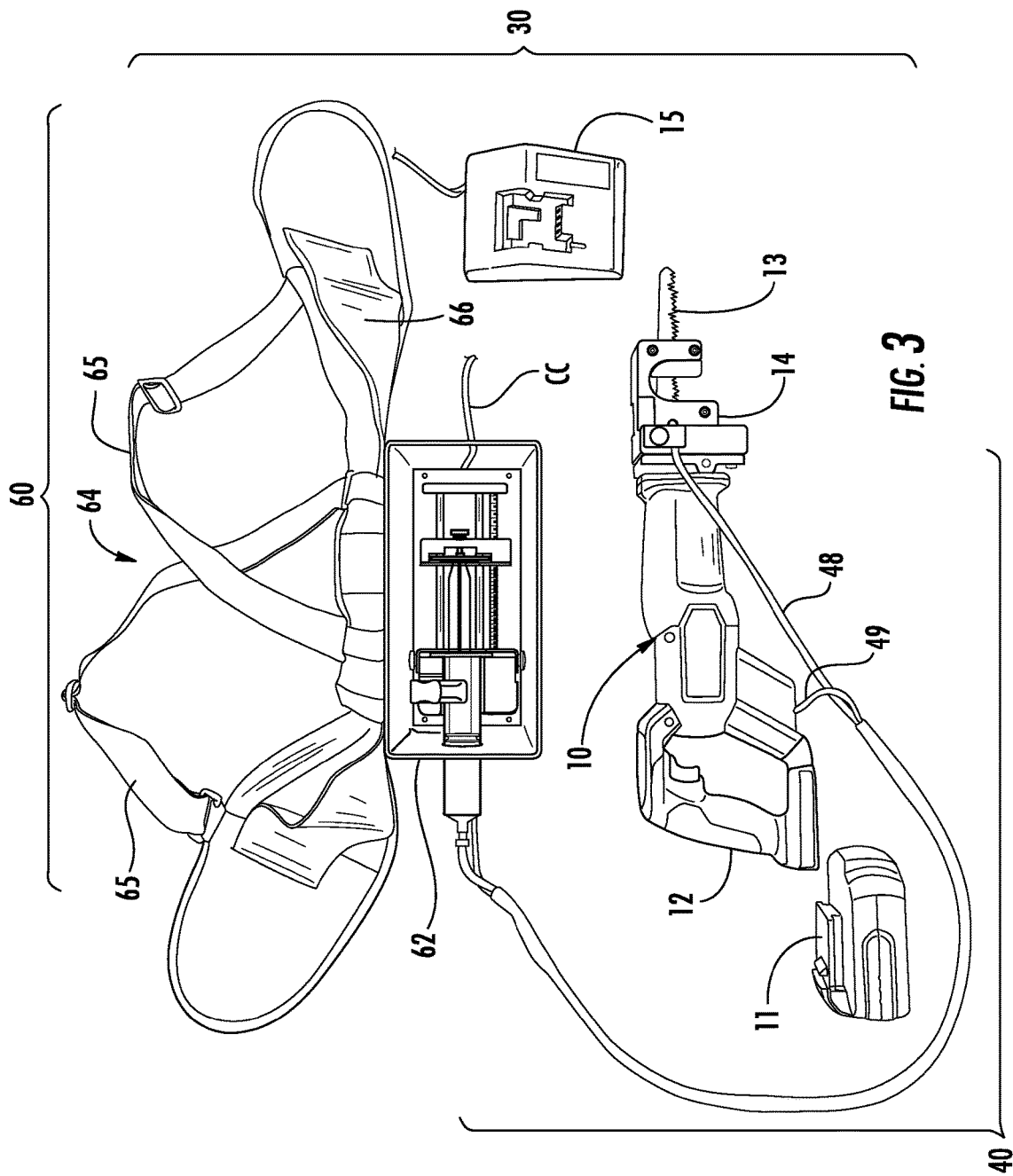
FIG. 3 is a partial perspective view of various components of the system shown in FIG. 2.

Various components of the system 30 are shown in greater detail in the partial perspective view of FIG. 3. In particular, the reciprocating saw 10, the fluid delivery assembly 40 of the apparatus 20 and the carrier assembly 60 are illustrated in an assembled configuration. The reciprocating saw 10 further comprises a charger stand 15 operable for charging and/or recharging a rechargeable battery 11 configured for removable attachment in electrical communication with the reciprocating saw 10 in a known manner. Battery 11 provides electrical power to the reciprocating saw 10, and as will be described hereinafter, to the fluid delivery assembly 40 of the apparatus 20. In one embodiment, the carrier assembly 60 may comprise a carrier 62 for containing a portion of the fluid delivery assembly 40 and a harness 64 adapted for supporting the carrier 62 on the body of an operator while the treatment fluid delivery system 30 is being operated to cut vegetation V.

As best seen in FIG. 1 and FIG. 2, in one embodiment the carrier 62 may be a generally rectangular or generally square enclosure defining a substantially hollow (open) interior compartment for containing a portion of the fluid delivery assembly 40. The carrier 62 comprise a lid 63 that is at least partially openable, or in the alternative, removable, to provide access to the interior compartment defined by the enclosure. As shown herein, the carrier 62 comprises a lid 63 that is attached to the enclosure with a zipper or other releasable attachment means, such as one or more Velcro® fasteners, on three sides of the lid. In this manner, an operator may open the lid 63 of the carrier 62 to access the portion of the fluid delivery assembly 40 disposed within the interior compartment defined by the enclosure of the carrier 62 in an opened configuration. However, with the lid 63 in a closed configuration on the enclosure, the portion of the fluid delivery assembly 40 disposed therein is at least partially protected from exposure to the environment and ambient weather conditions. The carrier 62 may also be provided with one or more lateral or lengthwise openings for permitting components of the fluid delivery assembly 40 to enter and/or exit the interior compartment defined by the enclosure, as will be described. If desired, the carrier 62 may be made of a transparent or substantially translucent material so that an operator can observe the condition and operating status of the portion of the fluid delivery assembly 40 disposed within the enclosure.

The harness 64 of the carrier assembly 60 is attached to at least one side of the carrier 62, and preferably, is attached to a rear side of the carrier 62 along at least one edge, such as along an upper edge of the rear side of the carrier 62. Harness 64 comprises a series of adjustable shoulder and/or arm straps 65 for supporting the carrier 62 on the body of an operator while the reciprocating saw 10 and the fluid delivery apparatus 20 are used to treat vegetation V with a treatment fluid. The harness 64 may further comprise a belt 66 for securing the harness around the torso or waist of the operator. Preferably, the harness 64 further comprises means for adjusting the belt 66 on the torso or waist of the operator, for example one or more buckles, Velcro®, etc. (not shown) in a known manner.

Figure 4:
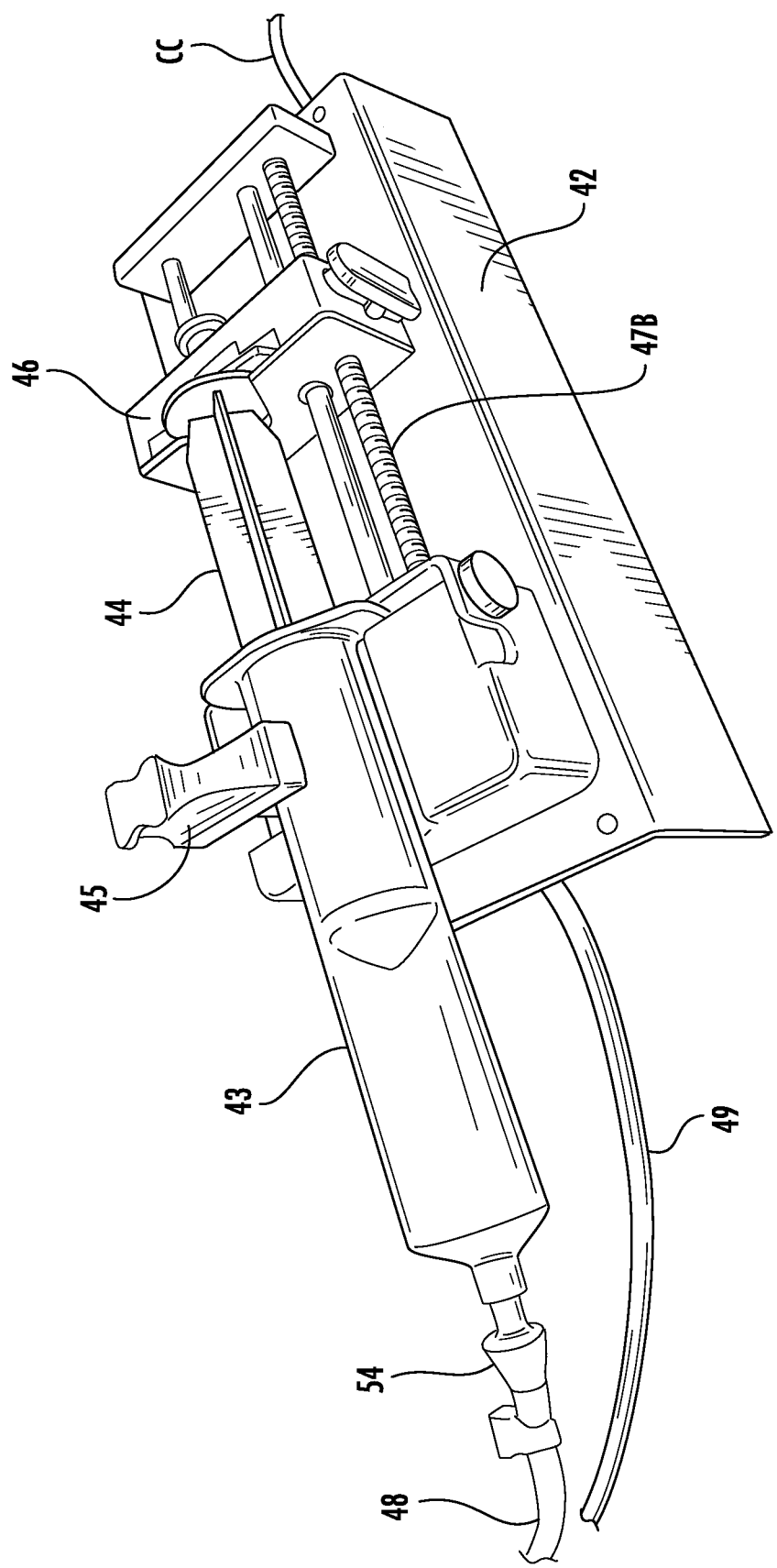
FIG. 4 is a top perspective view of a portion of the fluid delivery assembly of the system shown in FIG. 2 and FIG. 3.

FIG. 4 is a top perspective view of the portion of the fluid delivery assembly 40 disposed within the carrier 62 of the apparatus 20. In one embodiment, the fluid delivery assembly 40 comprises an inverted, generally U-shaped support 42 for mounting various components of the fluid delivery assembly 40. The support 42 may be made of any suitably rigid material, but preferably is made of a relatively thermally conductive material, such as metal, for a purpose to be described. A treatment fluid reservoir for containing the treatment fluid is mounted on an upper surface of the support 42. As shown herein, the reservoir comprises a syringe 43 defining an interior compartment for containing the treatment fluid and a plunger 44 for dispensing treatment fluid from the syringe 43 through a relatively small opening provided at a tip of the syringe opposite the plunger 44 in a conventional manner. The syringe 43 is removably mounted on the upper surface of the support 42 by a releasable syringe mount 45 so that the syringe 43 may be removed to be re-filled or replaced. As shown, syringe mount 45 comprises an arm that is biased into engagement with the syringe 43 and is movable against the bias out of engagement with the syringe 43. A first end of the plunger 44 is concentrically disposed within the syringe 43, while an opposite second end of the plunger 44 is disposed on a movable plunger guide 46. Consequently, the first end of the plunger 44 is movable within the syringe 43 to dispense the treatment fluid in a known conventional manner.

Figure 5:
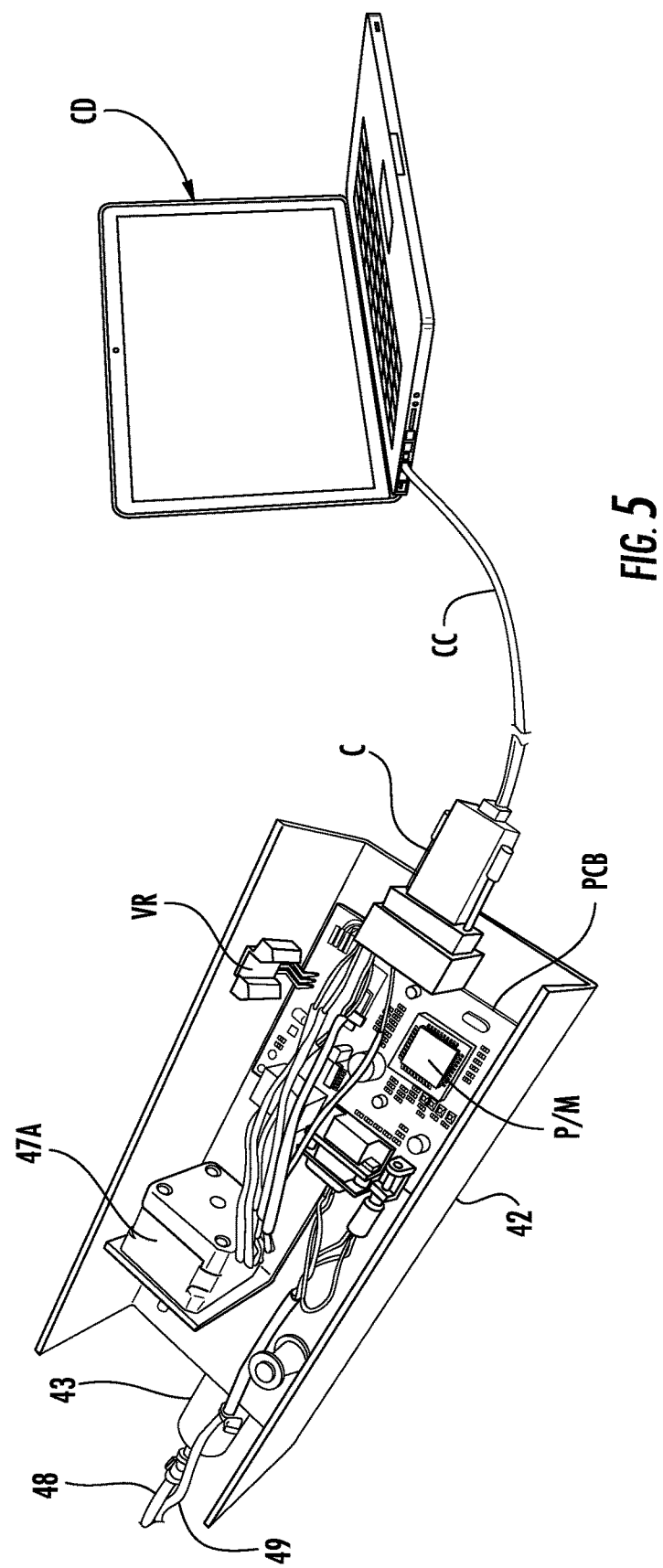
FIG. 5 is a bottom perspective view of the portion of the fluid delivery assembly shown in FIG. 4 electrically connected to an external computing device.

FIG. 5 is a bottom perspective view of the portion of the fluid delivery assembly 40 disposed within the carrier 62 of the apparatus 20. The PCB is mounted to the underside of the support 42 between the opposed downwardly depending flanges of the U-shaped support 42. The PCB comprises a processor P and memory M for storing data in an electrical signal format and a processor for executing programmed commands in a conventional manner. If desired, the PCB may interface with a connector C provided on one end of the data communication cable CC extending between the PCB and the external mobile computing device CD (laptop, tablet, Smartphone, etc.) previously described. The fluid delivery assembly 40 further comprises a drive means 47A, such as a graduated motor configured for inducing linear motion, stepper motor or the like, for driving the plunger guide 46, and thus the plunger 44, in a linear fashion. As shown herein, a stepper motor 47A is operably coupled with at least one threaded rail 47B provided on the top surface of the support 42. The stepper motor 47A receives programmed commands from the processor of the PCB to drive the rail 47B a predetermined rotation based on the operating parameters received from the computing device CD. The externally threaded rail 47B is engaged with an internally threaded insert disposed through the plunger guide 46, such that the plunger guide 46 movably rides along the rail 47B. As a result, the plunger 44 mounted on the plunger guide 46 advances a predetermined amount of linear travel within the syringe 43 in response to the operating parameters programmed into the processor and memory P/M of the PCB.

As shown in FIG. 5, the fluid delivery assembly 40 further comprises a voltage regulator VR in electrical communication with the PCB. If necessary, the voltage regulator VR regulates, or steps down, the voltage from an external source of electrical power to the PCB and the stepper motor 47A. The external source of electrical power may be a portable energy source, such as a battery or rechargeable battery, separate from the rechargeable battery 11 of the reciprocating saw 10. In one embodiment, however, the PCB and the stepper motor 47A receive electrical power from the rechargeable battery 11 of the reciprocating saw 10. Typically, the rechargeable battery 11 provides electrical power to the reciprocating saw 11 at about eighteen (18) volts. In contrast, the PCB and the stepper motor 47A typically operate on electrical power at about twelve (12) volts. Consequently, in certain embodiments, the voltage regulator VR is operable to transform the electrical power from the eighteen (18) volts supplied by the rechargeable battery 11 of the reciprocating saw 10 down to the twelve (12) volts required for operation of the PCB and the stepper motor 47A.

If desired, one or more electrical switches S may be provided at a convenient location on the reciprocating saw 10 for selectively operating the saw blade 13 of the reciprocating saw 10, or alternatively, the stepper motor 47A of the fluid delivery assembly 40. During normal operation, it is expected that the stepper motor 47A will operate in synchronization, or in near synchronization, with movement of the saw blade 13 of the reciprocating saw 10 to deliver treatment fluid to the cut portion CP as the vegetation V is cut, trimmed, pruned or the like. As shown herein, the voltage regulator VR is mounted onto one of the flanges of the U-shaped support 42 so that the metal support 42 acts as a separate heat sink for both the PCB and the voltage regulator VR. Preferably, the support 42 is made of an aluminum alloy metal material so that the support 42 provides adequate thermal conduction and radiation, while being lightweight so as to reduce the overall weight of the portion of the fluid delivery assembly 40 disposed within the carrier 62 of the apparatus 20.

The fluid delivery assembly 40 further comprises a fluid delivery tube 48 and an electrical power and logic cable 49 that each extend between the carrier 62 and the reciprocating saw 11. As previously mentioned, the carrier 62 may be provided with openings for permitting components of the fluid delivery assembly 40 to enter and/or exit the interior of the carrier 62. As best seen in FIG. 2, the carrier 62 has an opening configured (sized and shaped) to allow the end of the syringe 43 to extend outwardly from the carrier 62. The same or different opening may be provided to allow the electrical power and logic cable 49 to be routed from the reciprocating saw 11 to a power supply provided on the PCB for supplying electrical power to the components of the PCB, including the voltage regulator VR, and the stepper motor 47A. If desired, the carrier 62 may have a further opening on the same or another side of the enclosure to allow the data communication cable CC to be routed from the external mobile computing device CD to the connector C at the interface to the PCB.

Regardless, the fluid delivery tube 48 extends between a reservoir end at the tip of the syringe 43 to a delivery end at the blade housing 14 on the second end of the reciprocating saw 10. The electrical power and logic cable 49 extends between a power supply on the PCB, as previously described, and a power supply on the hand grip 12 at the first end of the reciprocating saw 10 that is operably coupled with the rechargeable battery 11. If desired, the fluid delivery tube 48 and the electrical power and logic cable 49 may be encased together within a protective sheath, casing or the like. Alternatively, or in addition, the tube 48 and the cable 49 may be wrapped around one another or both may be disposed within a spiral wrap in a known manner. In any event, it is desirable to maintain the fluid delivery tube 48 and the electrical power and logic cable 49 together so as to contain and minimize the loose components extending between the carrier 62 and the reciprocating saw 10 during operation to thereby reduce or eliminate any risk of the reciprocating blade 13 from contacting the fluid delivery tube 48 and/or the electrical power and logic cable 49.

As shown in FIG. 4, an adapter 54 is provided for connecting the fluid delivery tube 48 with the tip of the syringe 43 at the reservoir end of the fluid delivery assembly 40. Adapter 54 will be described in greater detail with reference to FIG. 8A. In one embodiment, adapter 54 is a quick-release type fitting that allows the reservoir end of the fluid delivery tube 48 to be readily connected and disconnected to the tip of the syringe 43.

Figure 6:
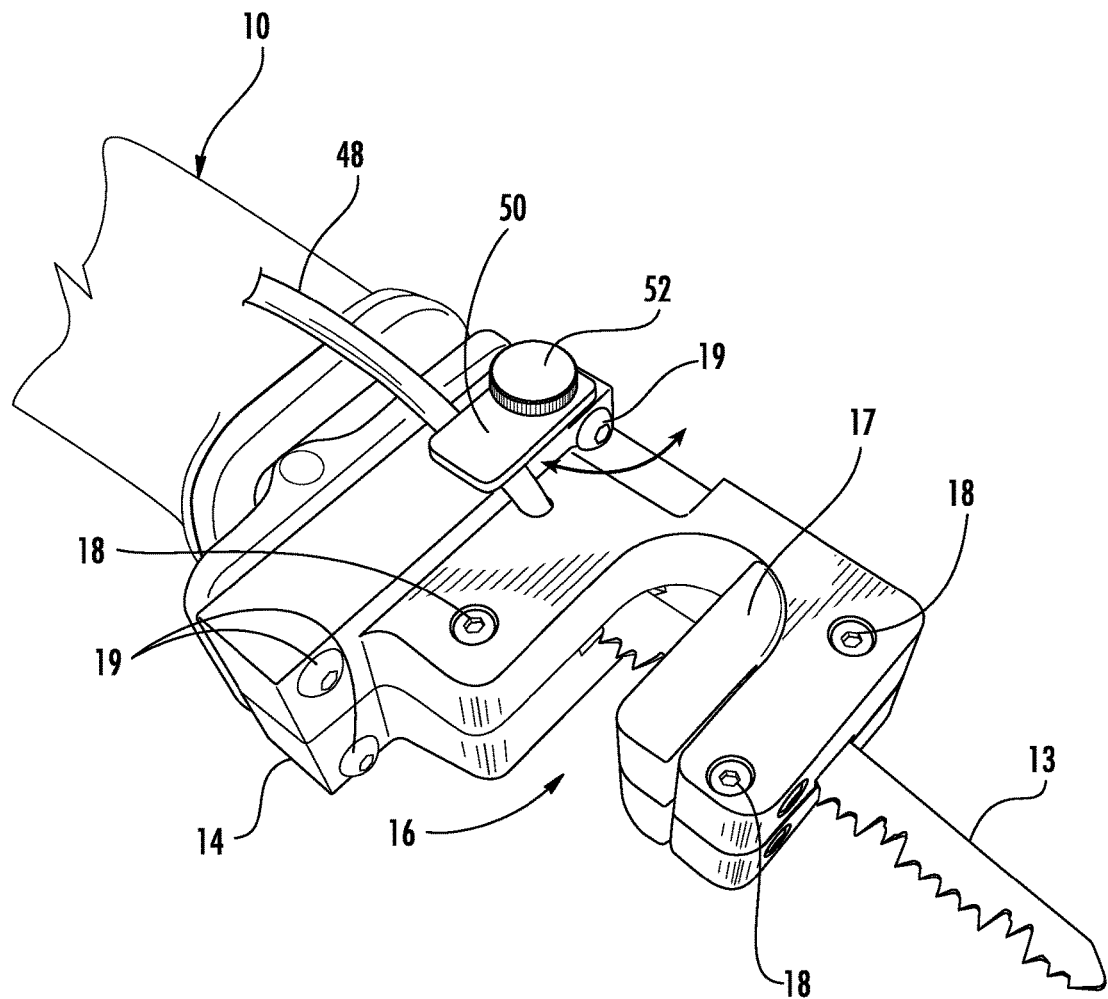
FIG. 6 is a perspective view of a delivery end of the fluid delivery assembly of the system shown in FIG. 2 and FIG. 3.
Figure 7:
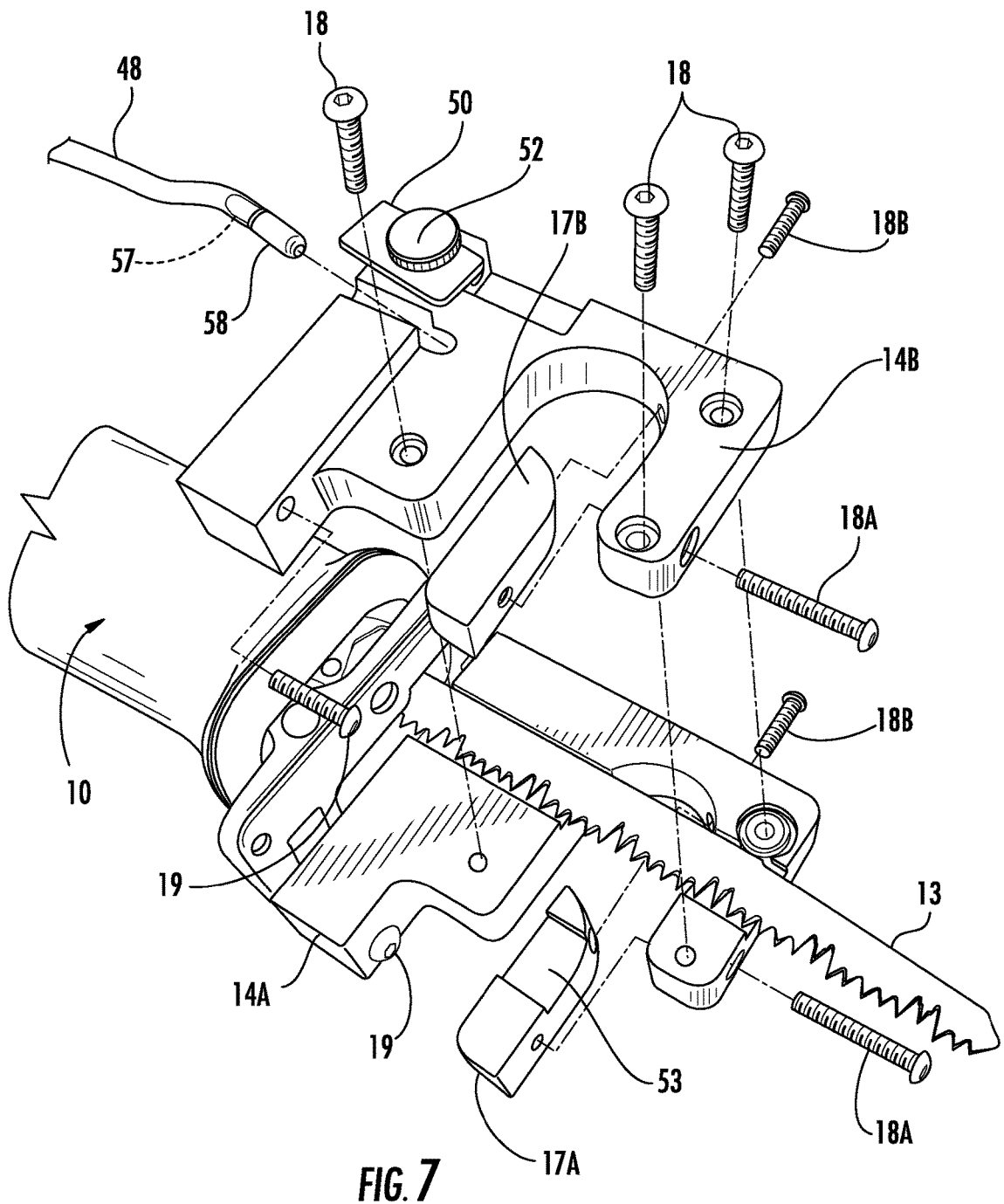
FIG. 7 is an exploded perspective view of the delivery end of the fluid delivery assembly shown in FIG. 6.

FIG. 6 and FIG. 7 show the delivery end of the fluid delivery assembly 40 with the fluid delivery tube 48 disposed within the blade housing 14 of the reciprocating saw 10. The blade housing 14 is modified to receive the delivery end of the fluid delivery tube 48 and to allow the treatment fluid within the fluid delivery tube 48 to be dispensed onto the cut portion CP of the vegetation V as the vegetation is cut, trimmed, pruned or the like. As shown herein, the blade housing 14 is formed as a left-hand portion 14A and a right-hand portion 14B that are secured together by a plurality of threaded fasteners 18, such as hex head machine screws. As best shown in FIG. 7, the left-hand portion 14A has a lengthwise recess configured (sized and shaped) to receive the saw blade 13 therein for reciprocating movement. The right-hand portion 14B has a slot-shaped through opening configured (sized and shaped) to receive the delivery end of the fluid delivery tube 48 therein and therethrough such that the treatment fluid is dispensed onto the cut portion CP of the vegetation V as the vegetation V is cut, trimmed, pruned or the like. Both the left-hand portion 14A and the right-hand portion 14B have an inverted, generally U-shaped recess 16 formed therein for receiving the vegetation V, for example a limb of a citrus tree, therein to be engaged by the saw blade 13 of the reciprocating saw 10 and the treatment fluid dispensed from the delivery end of the fluid delivery tube 48.

A movable plate 50 and a fastener 52, such as a thumb screw, thumb wheel or the like, may be provided to secure the delivery end of the fluid delivery tube 48 within the recess formed through the right-hand portion 14B of the blade housing 14. An optional insert 17 may also be provided to reduce the width of the recess formed in the blade housing 14 for receiving the vegetation V and thereby accommodate vegetation V having a smaller cross-section. As shown in FIG. 7, the insert 17 is preferably formed as a left-hand portion 17A and a right-hand portion 17B in the same manner as left-hand portion 14A and right-hand portion 14B of blade housing 14. Likewise, the left-hand portion 17A of the insert 17 has a recess 53 formed therein that is configured (sized and shaped) to receive the saw blade 13 of the reciprocating saw 10 in reciprocating movement. Threaded fasteners 18A and 18B, such as hex head machine screws, secure the left-hand and right-hand portions 17A, 17B to the left-hand and right-hand portions 14A, 14B of the blade housing 14, respectively. Similarly, threaded fasteners 19 secure the left-hand portion 14A and the right-hand portion 14B of the blade housing 14 to the second end of the reciprocating saw 10.

Figure 8A:
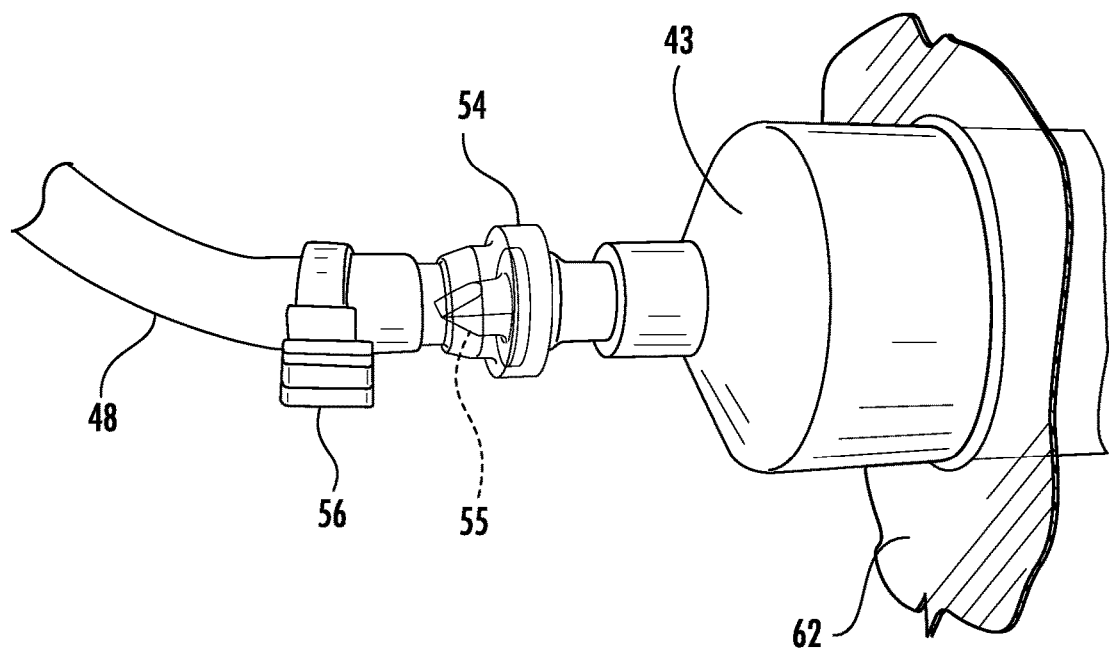
FIG. 8A is a detail perspective view of a reservoir end of the fluid delivery assembly.

FIG. 8A shows the reservoir end of the fluid delivery assembly 40, and more particularly, the reservoir end of the fluid delivery tube 48, in greater detail. As previously mentioned, adapter 54 in the form of a quick-release type fitting, allows the delivery end of the fluid delivery tube 48 to be readily connected to and disconnected from the tip of the syringe 43. The fluid delivery tube 48 may be press fit in relatively tight engagement onto the adapter 54. Alternatively or in addition, a biased expandable spring clamp, a cable tie or the like may be provided to secure the fluid delivery tube 48 onto the adapter 54, as shown herein. In one embodiment, a one-way check valve 55 is disposed within the adapter 54 or the fluid delivery tube 48 to prevent back-flow of the treatment fluid from the fluid delivery tube 48 back into the syringe 43. It has been found that a miniature duckbill valve made of an elastomeric material of the type available from Minivalve International of Yellow Springs, Ohio, USA, is suitable for use with the fluid delivery assembly 40 of the present invention.

Figure 8B:
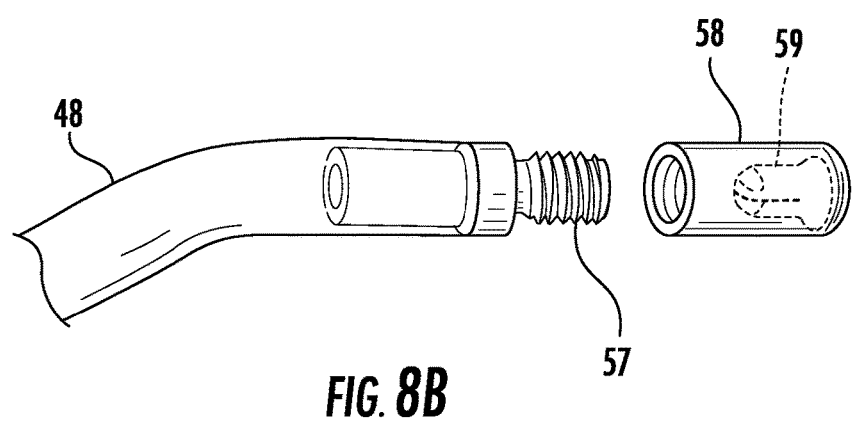
FIG. 8B is a detail perspective view of the delivery end of the fluid delivery assembly.

FIG. 8B shows the delivery end of the fluid delivery assembly 40, and more particularly, the delivery end of the fluid delivery tube 48, in greater detail. As shown herein, an externally threaded metering valve barb 57 is inserted into the delivery end of the fluid delivery tube 48 with at least a portion of the threads extending beyond the end of the fluid delivery tube 48. Preferably, the barb 57 is press fit into the fluid delivery tube 48 in relatively tight engagement with the fluid delivery tube 48. An internally threaded metering valve nosepiece 58 is configured to engage with the threads extending beyond the end of the fluid delivery tube 48 so as to secure the nosepiece 58 onto the barb 57. In one embodiment, a one-way check valve 59 is disposed within the fluid delivery tube 48, the metering valve barb 57 or the metering valve nosepiece 58 to restrict flow of the treatment fluid from the fluid delivery tube 48 into the recess adjacent the saw blade 13 of the reciprocating saw 10 without flow pressure being applied to the treatment fluid by, for example, advancing movement of the plunger 44 relative to the syringe 43. It has been found that a miniature duckbill valve made of an elastomeric material of the type available from Minivalve International of Yellow Springs, Ohio, USA, is suitable for use with the fluid delivery assembly 40 of the present invention. As a result of the presence of the metering valve barb 57 and the metering valve nosepiece 58, drops of the treatment fluid are deposited directly onto the cut portion CP of the vegetation V as long as the saw blade 13 of the reciprocating saw 10 is in contact with the vegetation V and the vegetation V is being cut, trimmed, pruned or the like.

The foregoing detailed description in conjunction with the accompanying drawing figures has shown and described embodiments of an apparatus 20 and a system 30 for delivering a treatment fluid to a cut portion CP of vegetation V as the vegetation V is cut, trimmed, pruned or the like. A method for delivering a treatment fluid to vegetation V as the vegetation V is cut, trimmed, pruned or the like according to the present invention utilizes the previously described apparatus 20 and system 30. The method comprises providing a fluid delivery assembly 40 including a reservoir 43 for containing a treatment fluid and a fluid delivery tube 48 that is in fluid communication with the reservoir 43. The method further comprises providing a reciprocating saw 10 having a saw blade configured for reciprocating movement that is operably coupled with the fluid delivery tube of the fluid delivery assembly to deliver the treatment fluid to a cut portion CP of the vegetation V as the vegetation is cut, trimmed, pruned or the like by the reciprocating movement of the saw blade.

In one embodiment, the method further comprises providing an external mobile computing device CD adapted for transmitting operating parameters to a printed circuit board PCB of the fluid delivery assembly 40. The PCB being operably coupled with a graduated motor configured for inducing linear motion, such as a stepper motor, to advance the movement of a plunger 44 relative to a syringe 43 containing the treatment fluid and in fluid communication with the fluid delivery tube 48. In another embodiment, a portion of the fluid delivery assembly 40 is disposed within an interior compartment defined by an enclosure of a carrier 62 configured to be supported on an operator while delivering the treatment fluid to the cut portion CP of the vegetation V as the vegetation is cut, trimmed, pruned or the like. In yet another embodiment, the method further comprises providing a check valve at one of a reservoir end of the fluid delivery tube 48 and a delivery end of the fluid delivery tube 48 to prevent back-flow of the treatment fluid from the fluid delivery tube 48 into the reservoir 43 or to prevent flow of the treatment fluid from the fluid delivery tube 48 to the saw blade 13 of the reciprocating saw 10, respectively.

Regardless of the foregoing description of exemplary embodiments of the present invention, the optimum configuration of the article of manufacture, apparatus, device or system, and the manner of use, operation and steps of the associated methods, as well as reasonable equivalents thereof, are deemed to be readily apparent and understood by those skilled in the art. Accordingly, equivalent relationships to those shown in the accompanying drawing figures and described in the written description are intended to be encompassed by the present invention and the broadest reasonable interpretation of the appended claims, the foregoing being considered as illustrative only of the general concept and principles of the invention(s). Furthermore, as numerous modifications and changes will readily occur to those skilled in the art, the exemplary embodiments are not intended to limit the invention to the specific configuration, construction, materials, manner of use and operation shown and described herein. Instead, all reasonably predictable and suitable equivalents and obvious modifications to the invention should be construed as falling within the scope of the invention as defined by the appended claims given their broadest reasonable construction and interpretation in view of the accompanying written description and drawing figures.

That which is claimed is:

1. An apparatus for delivering a treatment fluid to vegetation, comprising:
   a fluid delivery assembly operably coupled with a reciprocating saw having a saw blade such that a treatment fluid is delivered to a portion of the vegetation cut by the saw blade as the saw blade is reciprocated by operation of the reciprocating saw, the fluid delivery assembly comprising
      a reservoir for containing the treatment fluid, the reservoir comprising a syringe and a plunger disposed within the syringe that is operable for incremental advancing movement relative to the syringe to dispense the treatment fluid through an opening in the syringe;
      a fluid delivery tube having a reservoir end in fluid communication with the opening of the syringe and a delivery end positioned adjacent the portion of the vegetation cut by the saw blade; and
      a stepper motor operable for inducing the incremental advancing movement of the plunger relative to the syringe in a series of predetermined graduated steps to dispense a predetermined amount of the treatment fluid through the opening in the syringe;
   wherein the treatment fluid is delivered from the delivery end of the fluid delivery tube to the portion of the vegetation cut by the saw blade only as the reciprocating saw operates the saw blade to cut the vegetation.

2. The apparatus according to claim 1, wherein the stepper motor is operably coupled to a printed circuit board having a memory for storing one or more operating parameters of the stepper motor and a processor for executing the one or more operating parameters of the stepper motor to thereby induce the incremental advancing movement of the plunger relative to the syringe.

3. The apparatus according to claim 2, wherein the operating parameters of the stepper motor are provided to the memory of the printed circuit board by an external computing device in communication with the processor of the printed circuit board.

4. The apparatus according to claim 1, wherein the stepper motor receives electrical power through an electrical power and logic cable that is in electrical communication with a rechargeable battery power supply of the reciprocating saw such that the stepper motor does not require a separate source of electrical power.

5. The apparatus according to claim 1, wherein the fluid delivery assembly further comprises an adapter for connecting the reservoir end of the fluid delivery tube to the reservoir, the adapter comprising a check valve for preventing back-flow of the treatment fluid from the fluid delivery tube into the reservoir.

6. The apparatus according to claim 1, wherein the fluid delivery assembly further comprises a threaded metering valve barb and a threaded metering valve nosepiece configured for attachment to the metering valve barb, and wherein one of the metering valve barb and the metering valve nosepiece houses a check valve for preventing flow of the treatment fluid out of the fluid delivery tube onto the cut portion of the vegetation cut by the saw blade of the reciprocating saw when a flow pressure is not present in the fluid delivery tube.

7. The apparatus according to claim 1, wherein the fluid delivery tube extends between the reservoir and a blade housing of the saw blade of the reciprocating saw, and wherein the fluid delivery assembly further comprises an electrical power and logic cable that is in electrical communication with a power supply of the reciprocating saw.

8. A system for delivering a treatment fluid to vegetation, comprising:
   a reciprocating saw having a saw blade, the saw blade operable for powered reciprocating movement by the reciprocating saw to cut the vegetation and thereby produce a cut portion of the vegetation; and
   a fluid delivery assembly comprising:
      a reservoir for containing the treatment fluid, the reservoir comprising a syringe and a plunger disposed within the syringe that is operable for incremental advancing movement relative to the syringe to dispense the treatment fluid through an opening in the syringe;
      a fluid delivery tube in fluid communication with the opening of the syringe at a reservoir end and positioned adjacent the cut portion of the vegetation at a delivery end;
      a stepper motor operable for inducing the incremental advancing movement of the plunger relative to the syringe in a series of predetermined graduated steps to dispense a predetermined amount of the treatment fluid through the opening in the syringe;
      a printed circuit board electrically coupled with the stepper motor, the printed circuit board having a memory for storing one or more operating parameters of the stepper motor and a processor for executing the one or more operating parameters of the stepper motor to thereby induce the incremental advancing movement of the plunger relative to the syringe and thereby dispense the treatment fluid through the opening of the syringe into the fluid delivery tube at the reservoir end; and
      a rechargeable battery power supply operable for providing power to both the reciprocating saw and the fluid delivery assembly;
   wherein the fluid delivery assembly is operably coupled with the reciprocating saw so as to deliver the treatment fluid to the cut portion of the vegetation as the vegetation is cut by operation of the saw blade by the reciprocating saw.

9. The system according to claim 8, further comprising a carrier defining an interior compartment of an enclosure configured for containing a portion of the fluid delivery assembly and a harness attached to the carrier and having at least one strap for an operator to carry the carrier containing the portion of the fluid delivery assembly during operation of the reciprocating saw.

10. The system according to claim 8, wherein the operating parameters of the stepper motor are provided to the memory of the printed circuit board by an external computing device in communication with the processor of the printed circuit board, and wherein the stepper motor receives electrical power through an electrical power and logic cable that is in electrical communication with the rechargeable battery power supply.

11. The system according to claim 8, wherein the fluid delivery assembly further comprises an adapter for connecting the reservoir end of the fluid delivery tube to the reservoir, the adapter comprising a check valve for preventing back-flow of the treatment fluid from the fluid delivery tube into the reservoir, and wherein the fluid delivery assembly further comprises a metering valve barb and corresponding metering valve nosepiece configured for attachment to the metering valve barb at the delivery end of the fluid delivery tube, one of the metering valve barb and the metering valve nosepiece housing a check valve for preventing flow of the treatment fluid out of the fluid delivery tube onto the cut portion of the vegetation without a flow pressure present in the fluid delivery tube.

12. A method for delivering a treatment fluid to vegetation, comprising:
   providing a reciprocating saw having a saw blade operable for powered reciprocal movement of the saw blade to cut vegetation and thereby produce a cut portion of the vegetation;
   providing a fluid delivery assembly comprising a reservoir for containing the treatment fluid and a fluid delivery tube in fluid communication with the reservoir and with the reciprocating saw, the reservoir comprising a syringe and a plunger disposed within the syringe that is operable for incremental advancing movement relative to the syringe to dispense the treatment fluid through an opening in the syringe, the fluid delivery tube being in fluid communication with the opening of the syringe at a reservoir end of the fluid delivery tube and being-positioned adjacent the cut portion of the vegetation at a delivery end of the fluid delivery tube; and
   providing a stepper motor for moving the plunger relative to the syringe in a series of graduated steps to thereby dispense the treatment fluid through the opening in the syringe into the fluid delivery tube at the reservoir end;
   the fluid delivery assembly being operably coupled with the reciprocating saw to deliver the treatment fluid to the cut portion of the vegetation as the saw blade of the reciprocating saw is reciprocated by the reciprocating saw to produce the cut portion of the vegetation.

13. The method according to claim 12, further comprising providing an external computing device adapted for transmitting operating parameters to a printed circuit board of the fluid delivery assembly that is operably coupled with the stepper motor.

14. The method according to claim 12, wherein a portion of the fluid delivery assembly is disposed within an interior compartment defined by an enclosure of a carrier configured to be carried by an operator while operating the reciprocating saw and delivering the treatment fluid to the cut portion of the vegetation as the vegetation is cut by the saw blade.

\* \* \* \* \*